United States Patent
Brabec

(10) Patent No.: US 7,617,061 B2
(45) Date of Patent: Nov. 10, 2009

(54) METHOD AND APPARATUS FOR ACCURATELY DETERMINING HEIGHT COORDINATES IN A SATELLITE/LASER POSITIONING SYSTEM

(75) Inventor: Vernon Joseph Brabec, Livermore, CA (US)

(73) Assignee: Topcon Positioning Systems, Inc., Livermore, CA (US)

( * ) Notice: Subject to any disclaimer, the term of this patent is extended or adjusted under 35 U.S.C. 154(b) by 175 days.

(21) Appl. No.: 11/821,058

(22) Filed: Jun. 20, 2007

(65) Prior Publication Data

US 2008/0109181 A1  May 8, 2008

Related U.S. Application Data

(60) Provisional application No. 60/856,710, filed on Nov. 3, 2006.

(51) Int. Cl.
*G06F 19/00* (2006.01)
(52) U.S. Cl. .......................... 702/97; 702/105; 701/50; 219/121.67; 219/121.69; 219/121.72; 219/121.75; 219/121.83; 219/121.82; 219/121.73; 356/141.1; 356/139.01; 356/139.03; 356/139.1
(58) Field of Classification Search .................. 702/97, 702/105; 172/4.5, 2; 701/50, 37; 219/126.61, 219/126.6, 121.67, 121.69, 121.72, 121.73, 219/121.75, 121.83, 121.82, 121.84; 225/2, 225/96; 250/559.38, 559.31, 559.23; 356/401, 356/399, 400, 623, 139.01, 139.03, 139.1, 356/141.5, 141.1; 280/5.514, 6.157
See application file for complete search history.

(56) References Cited

U.S. PATENT DOCUMENTS

| 6,189,626 | B1 * | 2/2001 | Hanseder ................... 172/4.5 |
| 6,268,824 | B1 * | 7/2001 | Zhodzishky et al. ... 342/357.04 |
| 6,450,267 | B2 * | 9/2002 | Ohtomo et al. .............. 172/4.5 |
| 7,310,138 | B2 * | 12/2007 | Nichols et al. ......... 356/139.01 |
| 2001/0023766 | A1 * | 9/2001 | Ohtomo et al. .............. 172/4.5 |
| 2005/0274879 | A1 * | 12/2005 | Osaragi et al. ......... 250/231.13 |
| 2006/0012777 | A1 * | 1/2006 | Talbot et al. ........... 356/139.01 |
| 2006/0279727 | A1 * | 12/2006 | Nichols et al. ......... 356/139.01 |
| 2007/0058161 | A1 * | 3/2007 | Nichols et al. ......... 356/139.01 |
| 2008/0208417 | A1 * | 8/2008 | Buehlmann et al. ........... 701/50 |

* cited by examiner

*Primary Examiner*—Carol S Tsai
(74) *Attorney, Agent, or Firm*—Jeffrey M. Weinick; Wolff & Samson PC

(57) ABSTRACT

Disclosed is a method and apparatus for processing signals in a satellite/laser positioning system capable of generating location coordinates from received satellite signals and a received laser signal. A height coordinate bias value is maintained by a filter processor during periods when the laser signal is available. The height coordinate bias value represents an estimated difference between a satellite signal derived height coordinate and a laser signal derived height coordinate. During periods when the laser signal is available, the laser signal derived height coordinate is output. During periods when the laser signal is not available, a corrected height coordinate value is generated by applying the height coordinate bias value to the satellite signal derived height coordinate.

13 Claims, 5 Drawing Sheets

METHOD AND APPARATUS FOR ACCURATELY DETERMINING HEIGHT COORDINATES IN A SATELLITE/LASER POSITIONING SYSTEM

This application claims the benefit of U.S. Provisional Application No. 60/856,710 filed Nov. 3, 2006, which is incorporated herein by reference.

BACKGROUND OF THE INVENTION

The present invention relates generally to satellite/laser positioning systems, and more particularly to accurately determining height coordinates in a satellite/laser positioning system.

There are various types of positioning systems for determining the position of an object. For example, in a global navigation satellite system (GNSS) a navigation receiver receives and processes radio signals transmitted by satellites. Examples of such GNSS systems are the Global Positioning System (GPS) of the United States, the Global Navigation Satellite System (GLONASS) of Russia, and the planned Galileo system of Europe. Generally, the term GPS will be used herein, but it should be recognized that the discussion herein is equally applicable to any type of GNSS.

A GPS receiver measures the time delay of received satellite signals relative to a local reference clock. These measurements enable the receiver to determine the so-called pseudo-ranges between the receiver and the satellites. If the number of satellites is large enough, then the measured pseudo-ranges can be processed to determine the user location and time. The accuracy of the location determination may be increased through the use of various techniques. One such technique is differential navigation (DN) in which the task of finding the user position, also called the rover, is performed relative to a base station at a known location. The base station has a navigation receiver which receives and processes the signals of the satellites to generate measurements. These signal measurements are transmitted to the rover via a communication channel (e.g., wireless). The rover uses these measurements received from the base, along with its own measurements taken with its own navigation receiver, in order to determine its location precisely. The location determination is improved in the differential navigation mode because the rover is able to use the base station measurements in order to compensate for errors in the rover measurements.

The location determination accuracy of differential navigation may be improved further by supplementing the pseudo-range measurements with measurements of the phases of the satellite carrier signals. If the carrier phase of the signal received from a satellite in the base receiver is measured and compared to the carrier phase of the same satellite measured in the rover receiver, measurement accuracy may be obtained to within several percent of the carrier's wavelength.

The above described general scheme of computations is well known in the art and is described in further detail, for example, in, Bradford W. Parkinson and James J. Spilker Jr., *Global Positioning Theory and Applications*, Volume 163 of Progress In Astronautics and Aeronautics, published by the American Institute of Aeronautics and Astronautics, Inc, Washington D.C., 1996. A real-time-kinematic (RTK) GPS system, which utilizes satellite carrier phase in combination with differential navigation techniques is described in U.S. Pat. No. 6,268,824, which is incorporated herein by reference.

The above described navigation techniques result in highly accurate horizontal position measurements. However, one known deficiency in GPS location techniques is a lack of accuracy in vertical position measurements. As such, determining the height of a GPS receiver cannot be determined with the same accuracy as that for the horizontal measurements.

One technique for increasing the accuracy of height calculations is to supplement the GPS calculations with another system. For example, U.S. Patent Application Publication No. US2004/0125365 A1, entitled Working Position Measuring System, which is hereby incorporated by reference in its entirety, discloses a system that accurately determines the vertical angle (i.e., elevation angle) from an appropriately equipped rotating laser transmitter to a laser receiver. The rotating laser system generally includes a rotating laser at a fixed location, with a photodetector at the target location. The photodetector periodically detects the rotating laser beam and generates a signal based upon receipt of the laser (i.e., when the laser beam strikes a photocell of the detector). In an advantageous embodiment, the transmitted laser beam comprises fan shaped beams in the shape of the letter N. The signal may be processed using various techniques in order to provide additional positioning/geometric information, such as the vertical angle between the photodetector and the laser transmitter.

The above described rotating laser system itself only measures the vertical angle between the photodetector and the laser transmitter, and does not measure the height of the target. Using well known geometry (as will be discussed in further detail below), given the vertical angle between the photodetector and the laser transmitter, the relative height of the photodetector and the laser transmitter can be determined if the horizontal separation distance between the laser transmitter and the photodetector is known. Since the absolute height of the laser transmitter is known, the absolute height of the target can be determined once the relative height of the photodetector and the laser transmitter is calculated.

The horizontal separation distance between the laser transmitter and the photodetector may be determined using GPS techniques. In fact, the two systems complement each other. As discussed above, GPS techniques can provide highly accurate horizontal measurements, but less accurate vertical measurements. On the other hand, the rotating laser system can provide highly accurate vertical angles, but can only provide accurate height measurements if the vertical angle is supplemented with sufficiently accurate horizontal measurements. As such, an advantageous combination of the two systems provides highly accurate positioning in both horizontal and vertical measurements. Such a combined system is described in further detail in the above referenced U.S. Patent Application Publication No. US2004/0125365 A1. As shown in the referenced patent application Publication, such a system may be used in combination with a survey pole for use in connection with accurate survey applications, and with an earthmoving machine for use in connection with accurate construction applications.

One problem with the above described satellite/laser positioning system arises when the laser signal becomes unavailable for some reason. For example, in a construction application, machinery or structures may come between the rotating laser transmitter and the laser receiver of the rover. During obstruction of the line of sight between the laser transmitter and the laser receiver of the rover, there is a disruption in the available height information. This results in a reduced accuracy of the position determination.

BRIEF SUMMARY OF THE INVENTION

The present invention provides an improved technique for processing signals in a satellite/laser positioning system capable of generating location coordinates from received satellite signals and a received laser signal. In accordance with an embodiment of the invention, a height coordinate bias value is maintained during periods when the laser signal is available. The height coordinate bias value represents an estimated difference between a satellite signal derived height coordinate and a laser signal derived height coordinate. During periods when the laser signal is available, the laser signal derived height coordinate is output. During periods when the laser signal is not available, a corrected height coordinate value is generated by applying the height coordinate bias value to the satellite signal derived height coordinate. The height coordinate bias value may be maintained using an appropriate filter during periods of laser signal availability.

In one embodiment, the height coordinate bias value is calculated by a filter processor that receives satellite signal derived location coordinates from a satellite signal processor, and receives laser signal derived location coordinates from a laser processor. During periods when the laser signal is available, a control signal controls a switch to output the laser signal derived height coordinate. During periods when the laser signal is not available, a control signal controls the switch to output a corrected height coordinate value from the filter processor. The filter processor generates the corrected height coordinate value by applying the height coordinate bias value to the satellite signal derived height coordinate.

These and other advantages of the invention will be apparent to those of ordinary skill in the art by reference to the following detailed description and the accompanying drawings.

DETAILED DESCRIPTION

Figure 1:
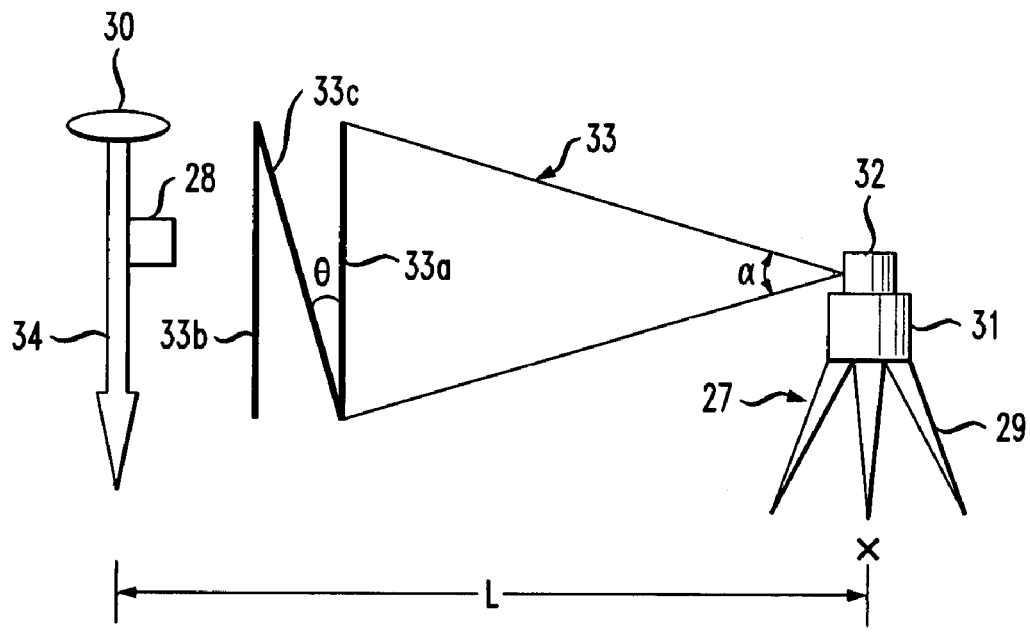
FIG. 1 shows a system including a survey pole and a rotating laser in which the principles of the present invention may be implemented.

One system in which the present invention has advantageous applicability is shown in FIG. 1. The system comprises a rotary laser device 27 for projecting a fan-shaped beam by rotary irradiation and a photodetection sensor device 28 for receiving the fan-shaped beam.

A tripod 29 is installed so that the tripod is aligned with a known point X, and the rotary laser device 27 is mounted on the tripod 29. The rotary laser device 27 comprises a main unit 31 and a rotator 32 rotatably mounted on the main unit 31. A laser beam 33 is projected by rotary irradiation from the rotator 32. The photodetection sensor device 28 is supported by a predetermined supporting means. FIG. 1 shows how the device is operated in field operation. The photodetection sensor device 28 is installed on a rod 34 (e.g., a survey rod), which can be manually carried by an operator. On an upper end of the rod 34, there is provided a GPS position measuring device 30. By using the GPS position measuring device 30, an absolute position on the ground can be measured based on a signal from a navigation satellite.

The laser beam 33 comprises a plurality of fan-shaped laser beams 33$a$ and 33$b$ in a vertical direction and a fan-shaped beam 33$c$ tilted diagonally with respect to the fan-shaped beams 33$a$ and 33$b$ at an angle of $\theta$, forming an N-shaped configuration. Also, the laser beams 33$a$ and 33$b$ are projected with a spreading angle $\alpha$ respectively.

Figure 2:
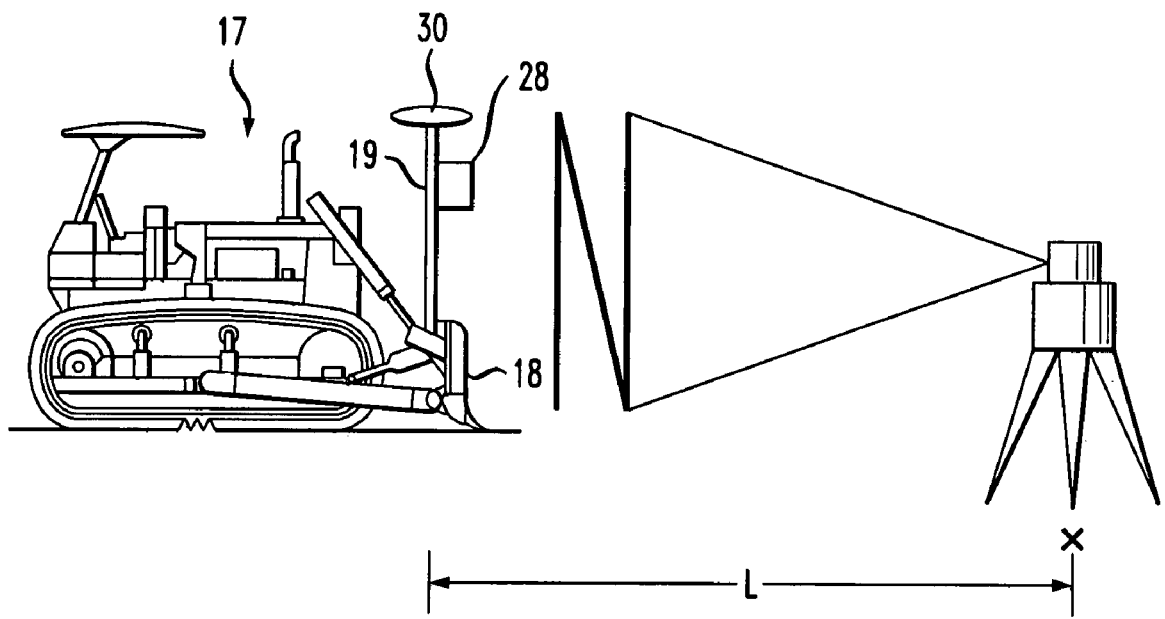
FIG. 2 shows a system including an earthmoving machine and a rotating laser in which the principles of the present invention may be implemented.

Another system in which the present invention has advantageous applicability is shown in FIG. 2. In FIG. 2 the photodetector device 28 is fixed on a working tool of a construction machine (e.g., on a blade 18 of a bulldozer 17). A mounting pole 19 is erected on the blade 18, and the photodetection sensor device 28 is mounted on the mounting pole 19, and a GPS position measuring device 30 is installed at an upper end of the mounting pole 19. The bulldozer 17 comprises an excavation operation control unit (not shown) such as a computer to control the operation of the blade 19.

In both the systems of FIGS. 1 and 2, the photodetection sensor device comprises a photodetection unit for receiving the fan-shaped beams and an arithmetic unit for calculating a vertical angle relative to the rotary laser device based on photodetection signals produced when the photodetection unit receives the light beam. The vertical angle produced by the photodetection sensor device may be used in conjunction with the GPS position measuring device to increase the accuracy of the position determination task.

Further details of the functioning of a rotating laser system of the type described herein in conjunction with FIGS. 1 and 2, and the determination of a vertical angle, may be found in the above referenced U.S. Patent Application Publication No. US2004/0125365 A1.

Figure 3:
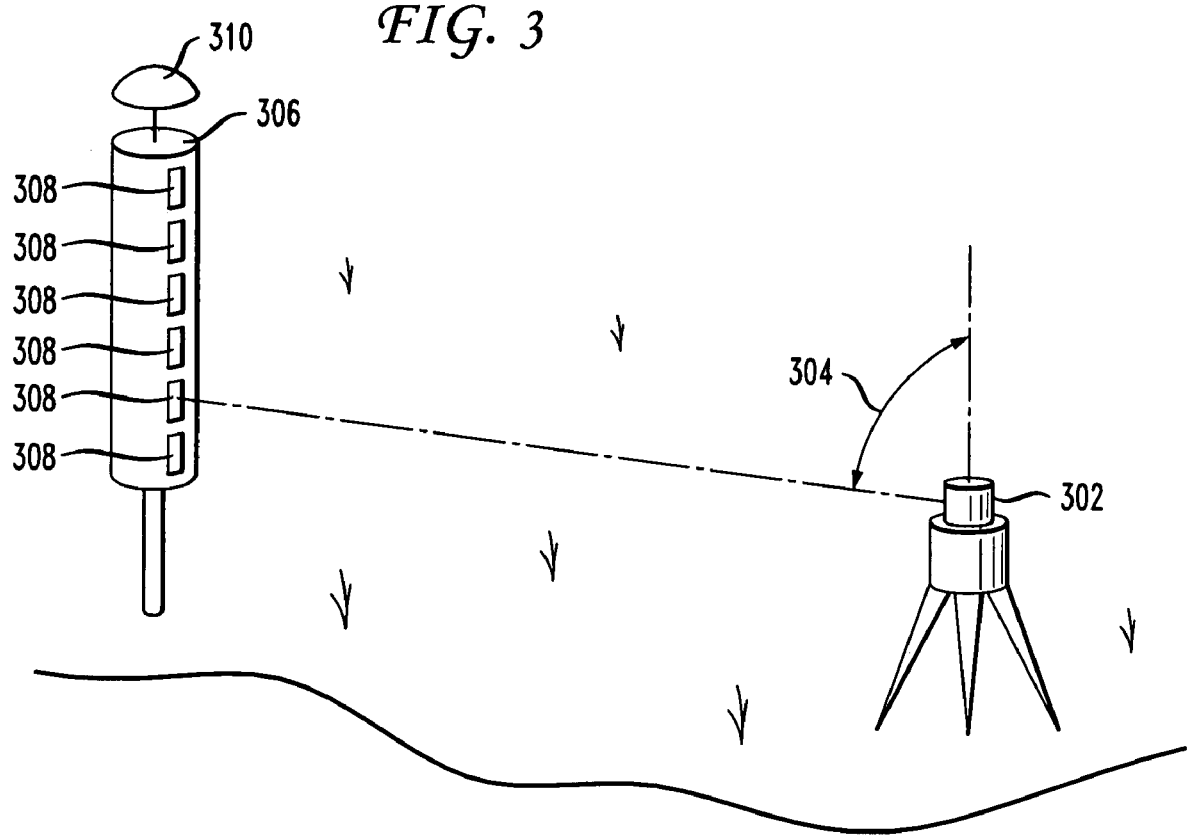
FIG. 3 shows a system including a plane laser system in which the principles of the present invention may be implemented.

In addition to the N-shaped configuration beam, other alternative means may be used in order to determine a vertical angle of a target relative to a known location. For example, FIG. 3 shows a plane laser system as one such alternative. FIG. 3 shows a laser transmitter 302 that transmits a plane laser at a known slope angle 304. The target device 306 has multiple photodetection sensors 308 for detecting the transmitted laser. The system can calculate the vertical angle of the transmitter relative to the target based upon which of the photodetection sensors 308 senses the laser and the known slope angle 304. As in the embodiments described in connection with FIGS. 1 and 2, the target device 306 may also include a GPS position measuring device 310 for determining an absolute position on the ground.

Figure 4:
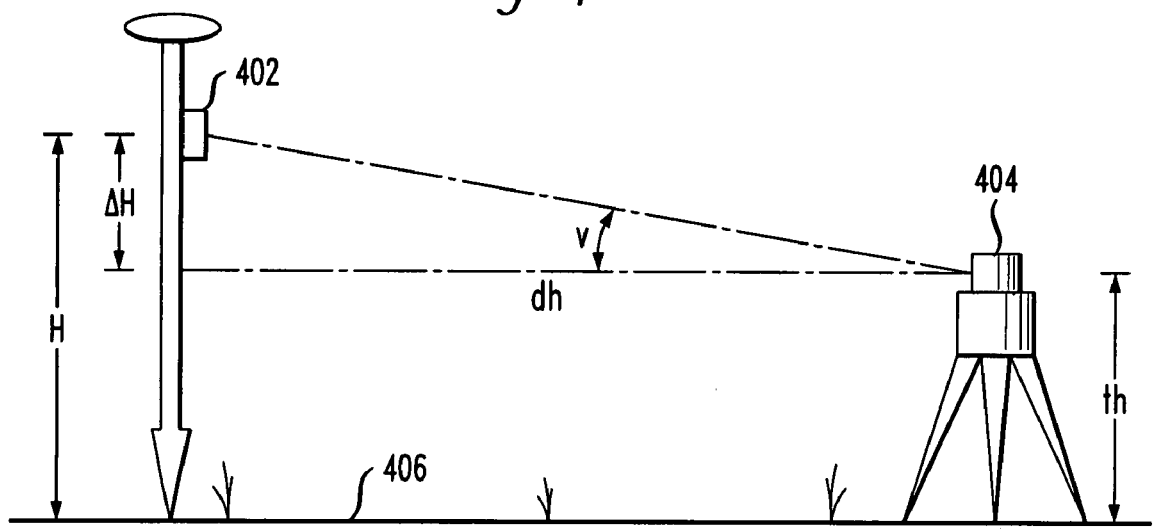
FIG. 4 illustrates the determination of the height of a target device relative to a known location given the vertical angle and horizontal distance (dh) between the target device and the known location.

The methods described above provide a vertical angle of the target relative to a known location as well as a horizontal distance between the target and the known location. Given this information, the height of the target may be determined using geometric relationships as follows. FIG. 4 illustrates the determination of the height of a target device 402 relative to a known location (which is shown in FIG. 4 as laser transmitter 404). Given vertical angle (v) and horizontal distance (dh), the relative height ($\Delta H$) may be determined by:

$$\Delta H = dh \times \tan(v) \quad (1)$$

Since the height (th) of transmitter 404 above the surface 406 is known, the absolute height (H) of target 402 may be determined by:

$$H = \Delta H + th \quad (2)$$

If the height H of target 402 needs to be determined with high accuracy, then an accurate distance measurement technique must be used to provide an accurate horizontal distance measurement. As described above in the background of the invention, one such accurate distance measurement technique is RTK GPS. An example of such a system is shown in FIGS. 14 and 15 of the above referenced U.S. Patent Application Publication No. US2004/0125365 A1. Those figures show a GPS base station antenna mounted directly over the turning axis of the rotating laser.

Figure 5A:
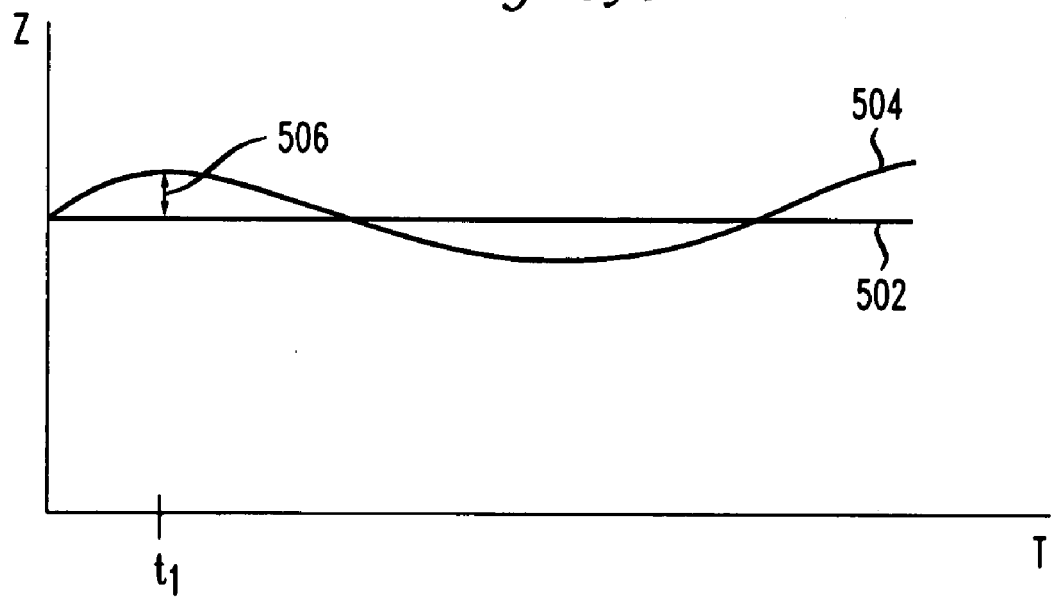
FIG. 5A is a graph illustrating the height coordinate accuracy that is available when using GPS processing alone as compared to the height coordinate accuracy that is available when using GPS in conjunction with a laser positioning system.

FIG. 5A is a graph illustrating the height coordinate accuracy that is available when using GPS processing alone as compared to the height coordinate accuracy that is available when using GPS in conjunction with a laser positioning system. The graph of FIG. 5A shows the height (Z) coordinate plotted against time (T). For ease of illustration, the graph of FIG. 5A shows the Z coordinate over time for a stationary rover. Line 502 represents the Z coordinate as determined by processing the received laser signal (referred to herein as $Z_m$) when the laser signal is available at the rover. As shown, the height measurement is stable and accurate when using the laser signal to determine the height. Line 504 represents the Z coordinate as determined by processing only the received GPS signals (referred to herein as $Z_R$), when the laser signal is not available at the rover. As shown, the height measurement is unstable and is less accurate when using the laser signal to determine the height. As described above, the graph of FIG. 5A shows the Z coordinate over time for a stationary rover in order to illustrate the variations over time of the GPS determined height coordinate as compared to the stable laser determined height coordinate. The same principles would apply for a moving rover.

Figure 5B:
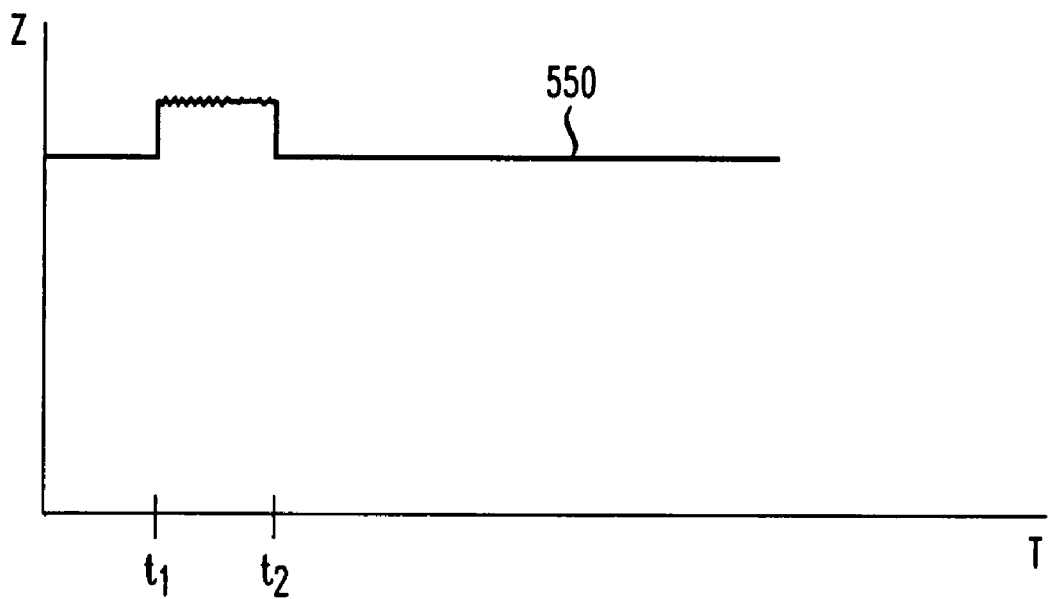
FIG. 5B is a graph illustrating the fluctuation in height coordinate calculation during a time period when the laser signal is unavailable and the receiver reverts to use of the uncorrected satellite signal derived height coordinate.

For any particular time t, there will be a difference (Delta—$\Delta$) between $Z_m$ and $Z_R$. In FIG. 5A, the $\Delta$ at time $t_1$, is shown as 506. This difference will fluctuate over time. Suppose that during operation the laser signal from the laser transmitter is blocked, and therefore not received at the laser receiver at the rover. In such a case, the height coordinate cannot be determined from the received laser signal (i.e., $Z_m$ is unavailable). In such a situation, the rover would revert to using the $Z_R$ height coordinate as a backup. This situation is illustrated in FIG. 5B. Consider a situation in which the laser signal is blocked from a time $t_1$ until a time $t_2$. Up until time $t_1$ the height coordinate measurement is obtained from the laser signal processing, and remains stable and accurate as represented by line 550. At time $t_1$, the system must revert to using the GPS determined height coordinate ($Z_R$), and due to the $\Delta$ between $Z_m$ and $Z_R$, the height coordinate measurement shows a jump at time $t_1$. Use of the GPS determined height coordinate ($Z_R$) continues until time $t_2$ when the height coordinate from the laser processing ($Z_m$) becomes available again. At this time, the height coordinate measurement shows another jump at time $t_2$. This fluctuation in available height coordinates is undesirable.

In accordance with an embodiment of the invention, the above described fluctuation in height coordinate is reduced by maintaining a height coordinate bias value B(n) during periods when the laser signal is available. This bias represents an estimated difference between the satellite signal derived height coordinate ($Z_R$) and the laser signal derived height coordinate ($Z_m$). During periods when the laser signal is unavailable, a corrected height coordinate is generated by applying the height coordinate bias value to the satellite signal derived height coordinate.

Figure 6A:
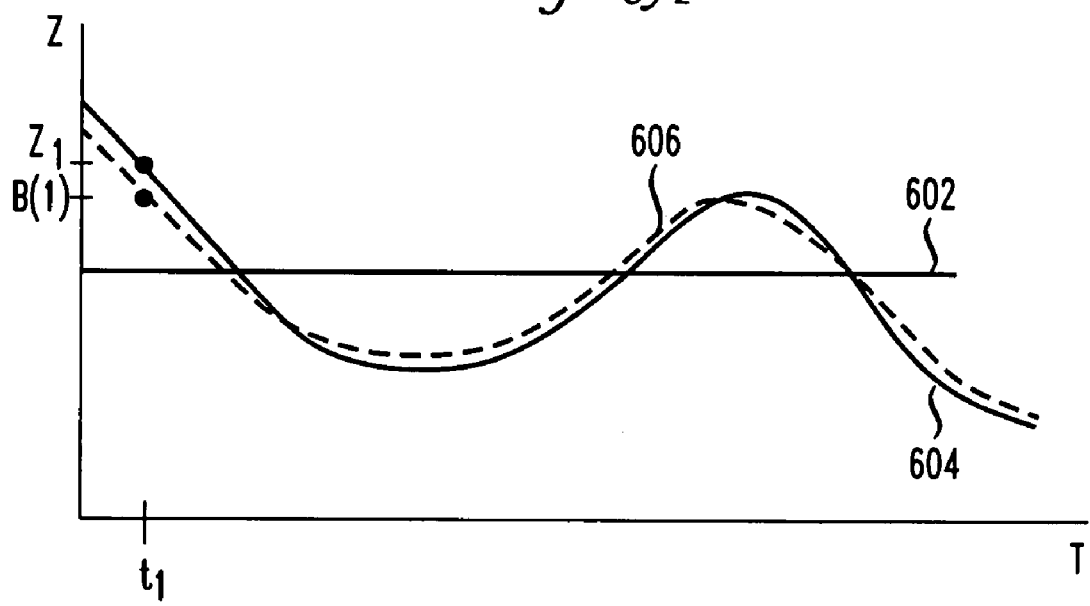
FIG. 6A is a graph illustrating a laser signal derived height coordinate, a GPS signal derived height coordinate, and height coordinate bias values.
Figure 6B:
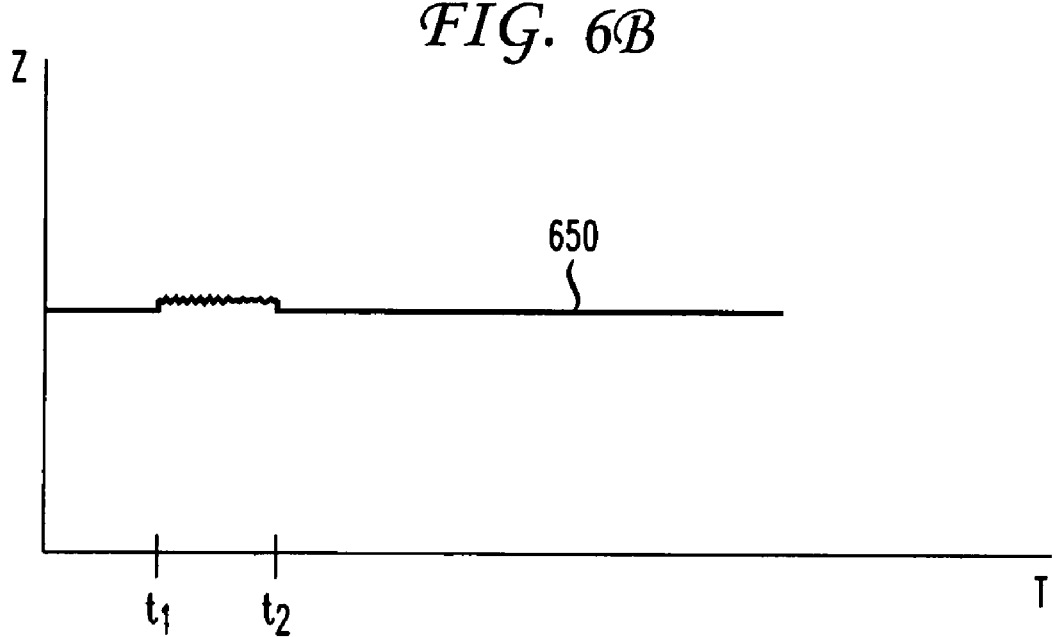
FIG. 6B is a graph illustrating the fluctuation in height coordinate calculation during a time period when the laser signal is unavailable and the receiver applies a bias value to the satellite signal derived height coordinate in order to improve the height coordinate calculation.

This use of a height coordinate bias value in accordance with an embodiment of the invention is illustrated in FIGS. 6A and 6B. FIG. 6A is a graph illustrating a laser signal derived height coordinate ($Z_m$) 602 and a GPS signal derived height coordinate ($Z_R$) 604. The graph of FIG. 6A shows these height coordinates plotted against time (T). As in FIG. 5A, for ease of illustration, the graph of FIG. 6A shows the height coordinates over time for a stationary rover. Also shown in FIG. 6A is dotted line 606, which represents height coordinate bias values which are maintained over time. For example, as shown in FIG. 6A, at time t0 the GPS signal derived height coordinate ($Z_R$) is $Z_1$ and the height coordinate bias value at time $t_1$ is B(1). If the laser signal becomes unavailable at time $t_1$, then as described above, the less accurate GPS signal must be used to obtain the height coordinate. In accordance with an embodiment of the invention, the bias value at time B(1) is applied to the GPS signal derived height coordinate in order to compensate for the $\Delta$ between the GPS signal derived height coordinate and the laser signal derived height coordinate. In this way, even during periods when the laser signal is not available, the generated height coordinate will be close to the highly accurate laser signal derived height coordinate.

FIG. 6B illustrates the use of the bias value to improve the height coordinate calculation during periods of laser signal unavailability. Consider a situation in which the laser signal is blocked from a time $t_1$ until a time $t_2$. Up until time $t_1$ the height coordinate measurement is obtained from the laser signal processing, and remains stable and accurate as represented by line 650. At time $t_1$, the system must revert to using the GPS signal derived height coordinate ($Z_R$). However, unlike the situation described in connection with FIG. 5B, in accordance with an embodiment of the invention, the height coordinate bias value that has been maintained during periods of laser signal availability is applied to the GPS signal derived height coordinate ($Z_R$). Thus, the resulting height coordinate value may be represented as $Z_R + B(n)$ to represent the application of the height coordinate bias value to the GPS signal derived height coordinate. The height coordinate bias value is applied to the GPS signal derived height coordinate ($Z_R$) until time $t_2$ when the height coordinate from the laser processing ($Z_m$) becomes available again. As illustrated in FIG. 6B, the fluctuation in height coordinate calculation during the period of laser signal unavailability (time $t_1$ until time $t_2$) is much less than the fluctuation shown in FIG. 5B. Thus, in accordance with this embodiment of the invention, the height coordinate determination is more accurate, even during periods of laser signal unavailability.

The height coordinate bias may be tracked using a filter. In one embodiment, the filter may be:

$$B(n)=a*B(n-1)+(1-a)*(R(n)-M(n))$$

where B(n) is the height coordinate bias at current time n, a is a variable update rate (e.g., 0.999 initially), B(n−1) is the previous bias value, R(n) is GPS signal derived height coordinate at current time n, and M(n) is the laser signal derived height coordinate at current time n. The variable update rate is tunable to different variables and is implementation specific.

Figure 7:
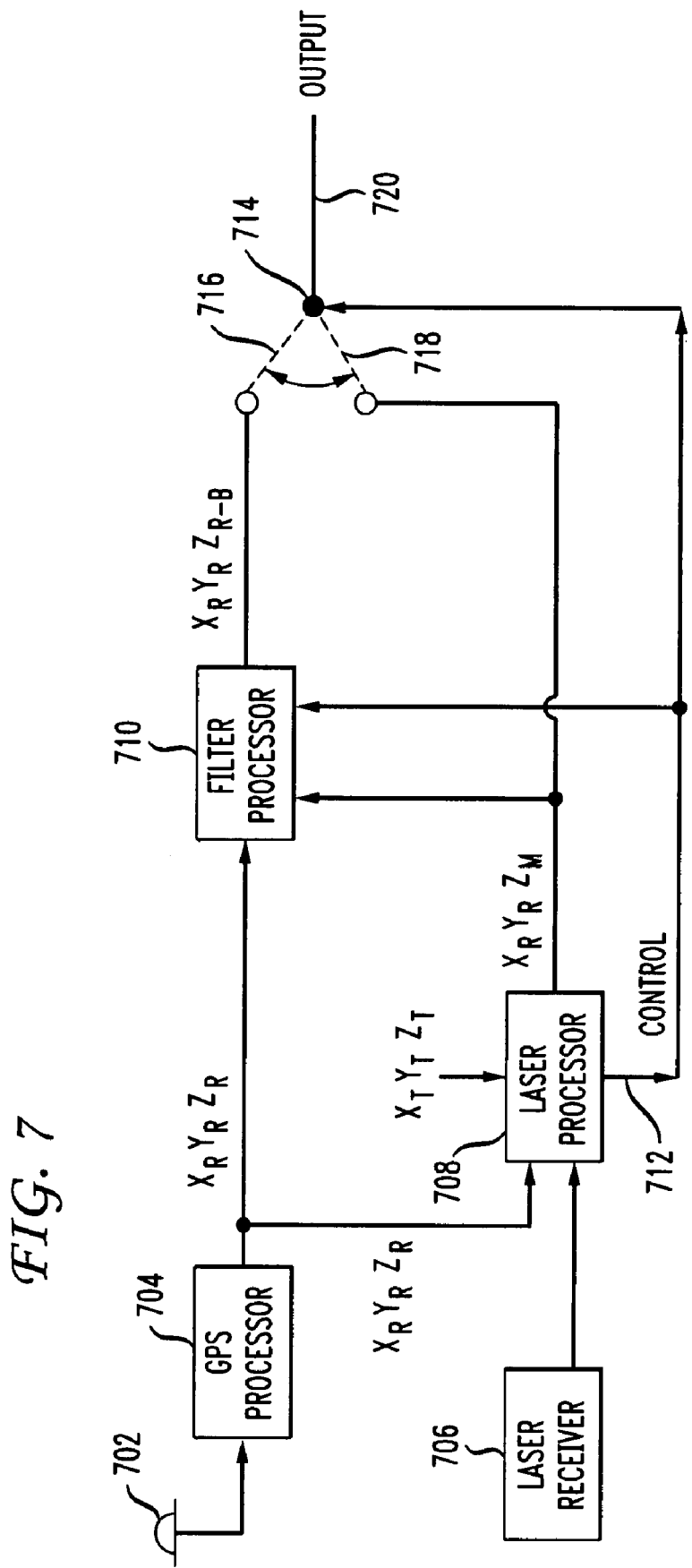
FIG. 7 is a high level block diagram of a satellite/laser positioning system configured to operate in accordance with an embodiment of the invention.

One embodiment of a satellite/laser positioning system configured to operate in accordance with the principles of the invention is shown in FIG. 7. The satellite/laser positioning system of FIG. 7 includes a satellite antenna 702 connected to a GPS processor 704. The GPS processor 704 receives the satellite signals and generates satellite signal derived position coordinates $X_R, Y_R, Z_R$. The operation of GPS processors for generating X, Y, and Z coordinates is well known in the art. The satellite laser positioning system also includes a laser receiver 706 connected to a laser processor 708. The laser receiver 706 receives a laser beam signal which, as described above, can be used by the laser processor 708 to generate a highly accurate laser signal derived height coordinate $Z_M$. The laser processor 708 also receives the satellite signal derived position coordinates $X_R, Y_R, Z_R$ from GPS processor 704, as well as the X, Y and Z coordinates of the laser transmitter ($X_T, Y_T, Z_T$). From these inputs, the laser processor 708 outputs coordinates $X_R, Y_R, Z_M$. Thus, the laser processor 708 outputs the highly accurate GPS signal derived X and Y coordinates ($X_R, Y_R$) and the highly accurate laser signal derived height coordinate ($Z_M$).

The satellite/laser positioning system also includes a filter processor 710 for maintaining the height coordinate bias as described above. The filter processor 710 receives the satellite signal derived position coordinates $X_R, Y_R, Z_R$ from GPS processor 704, as well as the coordinates $X_R, Y_R, Z_M$ output from the laser processor 708. The filter processor 710 uses the received height coordinates to maintain the height coordinate bias as described above. More particularly, using the notation from FIG. 7, the filter processor 710 calculates the height coordinate bias B for a particular time (n) according to:

$$B(n)=a*B(n-1)+(1-a)*(Z_R(n)-Z_M(n))$$

The laser processor 708 also outputs a control signal on line 712 which indicates whether the laser processor 708 is receiving data from the laser receiver 706 and is therefore currently processing the laser signal in order to generate the highly accurate laser signal derived height coordinate $Z_M$. The control signal is provided to filter processor 710 as well as to a switch 714. If the control signal indicates that the laser processor 708 is generating the highly accurate laser signal derived height coordinate $Z_M$, then switch 714 is moved to position 718 and the coordinates $X_R, Y_R, Z_M$ (including the highly accurate laser signal derived height coordinate $Z_M$) are output from the satellite/laser positioning system on line 720. Also, so long as the control signal indicates that the laser processor 708 is generating the highly accurate laser signal derived height coordinate $Z_M$, filter processor 710 continues to maintain the height coordinate bias as described above.

If the control signal indicates that the laser processor 708 is not generating the highly accurate laser signal derived height coordinate $Z_M$, then the filter processor 710 stops calculating the height coordinate bias. Further, in response to the control signal indicating that the laser processor 708 is not generating the highly accurate laser signal derived height coordinate $Z_M$, filter processor 710 applies the most recent height coordinate bias (B(n)) to the satellite signal derived position coordinates $X_R, Y_R, Z_R$ received from GPS processor 704. The result is that filter processor 710 generates X,Y,Z coordinates having a height coordinate corrected using the height coordinate bias value. More particularly, the filter processor 710 outputs the coordinates $X_R, Y_R, Z_{R-B}$, where $Z_{R-B}$ represents the satellite signal derived height coordinate corrected using the height coordinate bias. Also, when the control signal indicates that the laser processor 708 is not generating the highly accurate laser signal derived height coordinate $Z_M$, the switch 714 is moved to position 716 and the coordinates $X_R, Y_R, Z_{R-B}$ (including the corrected height coordinate $Z_{R-B}$) are output from the satellite/laser positioning system on line 720. The coordinates $X_R, Y_R, Z_{R-B}$ will continue to be output so long as the control signal from the laser processor 708 indicates that the laser processor 708 is not generating the highly accurate laser signal derived height coordinate $Z_M$.

It should be recognized that FIG. 7 is a high level functional block diagram of the components of one embodiment of a satellite/laser positioning system in accordance with the principles of the invention. The processors and other components shown in FIG. 7 may be implemented using well known hardware, software (i.e., computer program code and data), and combinations of hardware and software. An operational satellite/laser positioning system would also contain additional well known elements which, for clarity, are not shown in FIG. 7. Many various hardware/software configurations could be used to implement the present invention.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for processing signals in a receiver capable of generating location coordinates from received satellite signals and a received laser signal, said method comprising the steps of:
    maintaining a height coordinate bias value during periods when said laser signal is available;
    generating a corrected height coordinate value by applying said height coordinate bias value to a satellite signal derived height coordinate during periods when said laser signal is not available.

2. The method of claim 1 wherein said height coordinate bias value represents an estimated difference between said satellite signal derived height coordinate and a laser signal derived height coordinate.

3. The method of claim 1 further comprising the steps of:
    outputting a laser signal derived height coordinate during periods when said laser signal is available; and
    outputting said corrected height coordinate value during periods when said laser signal is unavailable.

4. The method of claim 1 wherein said height coordinate bias value is calculated as:

$$B(n)=a*B(n-1)+(1-a)*(R(n)-M(n))$$

where B(n) is the height coordinate bias at current time n, a is a variable update rate, B(n−1) is a previous bias value, R(n) is the satellite signal derived height coordinate at current time n, and M(n) is the laser signal derived height coordinate at current time n.

5. A receiver capable of generating location coordinates from received satellite signals and a received laser signal, said receiver comprising:
- a satellite signal processor configured to generate satellite signal derived location coordinates from received satellite signals;
- a laser signal processor configured to generate a laser signal derived height coordinate from a received laser signal; and
- a filter processor configured to maintain a height coordinate bias value during periods when said laser signal is available.

6. The receiver of claim 5 wherein said height coordinate bias value represents an estimated difference between a satellite signal derived height coordinate and said laser signal derived height coordinate.

7. The receiver of claim 6 wherein said filter processor is further configured to generate a corrected height coordinate value by applying said height coordinate bias value to said satellite signal derived height coordinate.

8. The receiver of claim 7 further comprising:
- a switch configured to output said laser signal derived height coordinate during periods when said laser signal is available and to output said corrected height coordinate value during periods when said laser signal is unavailable.

9. The receiver of claim 5 wherein said filter processor is configured to calculate said height coordinate bias value as:

$$B(n)=a*B(n-1)+(1-a)*(R(n)-M(n))$$

where B(n) is the height coordinate bias value at current time n, a is a variable update rate, B(n−1) is a previous bias value, R(n) is the satellite signal derived height coordinate at current time n, and M(n) is the laser signal derived height coordinate at current time n.

10. A satellite/laser positioning system capable of generating location coordinates from received satellite signals and a received laser signal, said satellite/laser positioning system comprising:
- means for maintaining a height coordinate bias value during periods when said laser signal is available; and
- means for generating a corrected height coordinate value by applying said height coordinate bias value to a satellite signal derived height coordinate during periods when said laser signal is not available.

11. The satellite/laser positioning system of claim 10 wherein said height coordinate bias value represents an estimated difference between said satellite signal derived height coordinate and a laser signal derived height coordinate.

12. The satellite/laser positioning system of claim 10 further comprising:
- means for outputting a laser signal derived height coordinate during periods when said laser signal is available; and
- means for outputting said corrected height coordinate value during periods when said laser signal is unavailable.

13. The satellite/laser positioning system of claim 10 wherein said means for maintaining a height coordinate bias value comprises means for calculating said height coordinate bias value as:

$$B(n)=a*B(n-1)+(1-a)*(R(n)-M(n))$$

where B(n) is the height coordinate bias at current time n, a is a variable update rate, B(n−1) is a previous bias value, R(n) is said satellite signal derived height coordinate at current time n, and M(n) is the laser signal derived height coordinate at current time n.

* * * * *

UNITED STATES PATENT AND TRADEMARK OFFICE
CERTIFICATE OF CORRECTION

PATENT NO. : 7,617,061 B2  
APPLICATION NO. : 11/821058  
DATED : November 10, 2009  
INVENTOR(S) : Vernon Joseph Brabec It is certified that error appears in the above-identified patent and that said Letters Patent is hereby corrected as shown below:

Column 5 lines 55-56, "Delta — Δ" should read --Delta - Δ--.

Column 6, line 30, "to" should read --$t_1$--.

Signed and Sealed this

Ninth Day of February, 2010

David J. Kappos  
*Director of the United States Patent and Trademark Office*